United States Patent
Juestel et al.

(10) Patent No.: US 6,462,473 B1
(45) Date of Patent: Oct. 8, 2002

(54) PLASMA PICTURE SCREEN WITH TERBIUM(III)-ACTIVATED PHOSPHOR

(75) Inventors: Thomas Juestel, Aachen; Gerhard Spekowius, Roetgen, both of (DE); Sybrandus Van Heusden, Eindhoven (NL); Gerrit Oversluizen, Eindhoven (NL); Siebe Tjerk De Zwart, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/860,313

(22) Filed: May 18, 2001

(30) Foreign Application Priority Data

May 19, 2000 (DE) .......................... 100 24 835

(51) Int. Cl.$^7$ ................................ H01J 17/49
(52) U.S. Cl. .................... 313/586; 313/582; 313/486
(58) Field of Search ................. 313/586, 581, 313/582, 585, 587, 485, 486

(56) References Cited

U.S. PATENT DOCUMENTS

| | | | |
|---|---|---|---|
| 5,903,381 A | * 5/1999 | Watanabe et al. | 359/254 |
| 6,004,481 A | 12/1999 | Rao | 252/301 |
| 6,008,582 A | * 12/1999 | Asano et al. | 313/582 |
| 6,344,715 B2 | * 2/2002 | Tokunaga et al. | 315/169.4 |

* cited by examiner

Primary Examiner—Ashok Patel
Assistant Examiner—Thelma Sheree Clove

(57) ABSTRACT

A plasma picture screen is provided with a front plate, which comprises a glass plate on which a dielectric layer and a protective layer are provided, with a carrier plate provided with a phosphor layer comprising a red and a blue phosphor as well as a green, $Tb^{3+}$-activated phosphor, with a ribbed structure that subdivides the space between the front plate and the carrier plate into plasma cells filled with a gas comprising xenon, and with one or several electrode arrays on the front plate and the carrier plate for generating corona discharges in the plasma cells. The gas comprises xenon in a proportion of between 5 and 30% by volume.

4 Claims, 1 Drawing Sheet

PLASMA PICTURE SCREEN WITH TERBIUM(III)-ACTIVATED PHOSPHOR

FIELD OF THE INVENTION

The invention relates to a plasma picture screen provided with a front plate, which comprises a glass plate on which a dielectric layer and a protective layer are provided, with a carrier plate provided with a phosphor layer comprising a red and a blue phosphor as well as a green, $Tb^{3+}$-activated phosphor, with a ribbed structure which subdivides the space between the front plate and the carrier plate into plasma cells which are filled with a gas comprising xenon, and with one or several electrode arrays on the front plate and the carrier plate for generating corona discharges in the plasma cells.

BACKGROUND AND SUMMARY

Plasma picture screens render possible color pictures with high resolution and large screen diagonal and have a compact construction. A plasma picture screen comprises a hermetically closed glass cell which is filled with a gas, with electrodes in a grid arrangement. The application of a voltage causes a gas discharge which generates light in the ultraviolet range (145 to 185 nm). This light can be converted into visible light by means of phosphors and be emitted through the front plate of the glass cell to the viewer.

Phosphors which are particularly efficient under vacuum UV excitation are used for plasma picture screens. Frequently used green-emitting phosphors are, for example, $Zn_2SiO_4$:Mn (ZSM) and $BaAl_{12}O_{19}$:Mn (BAL). Both materials show a saturated green emission color with a high y-value of y>0.7. A disadvantage of both materials is their comparatively long decay time $t_{1/10}$, for example, 30 ms for $Zn_2SiO_4$ with 2.5% Mn. The cause of this is that the transition $^4T_1 \rightarrow ^6A_1$ relevant for the emission of the light is spin-forbidden. In addition, the decay time $t_{1/10}$ and the color point of a $Mn^{2+}$-activated phosphor are strongly dependent on the $Mn^{2+}$ concentration. A further disadvantage is the sensitivity of $Mn^{2+}$ to an oxidation to $Mn^{3+}$ or $Mn^{4+}$, which reduces the stability of the phosphors.

By contrast, $Tb^{3+}$-activated phosphors are temperature stable and photostable, because $Tb^{3+}$ does not readily oxidize to $Tb^{4+}$. A further advantage of these phosphors over $Mn^{2+}$-activated phosphors is their shorter decay time $t_{1/10}$, which lies between 2 and 10 ms, depending on the host lattice.

U.S. Pat. No. 6,004,481 accordingly describes a green-emitting $Tb^{3+}$-activated phosphor for use in plasma picture screens which has the composition $(Y_{1-x-y-z}Gd_xTb_yCe_z)BO_3$, with 0.0<x<0.2, 0.01<y<0.1, and 0.0<z<0.1.

A major disadvantage of $Tb^{3+}$-activated phosphors is their yellowy-green color point, which has a low y-value of y<0.62.

The invention has for its object to provide a plasma picture screen with a $Tb^{3+}$-activated phosphor whose green pixels provide light with an improved color point.

This object is achieved by means of a plasma picture screen provided with a front plate, which comprises a glass plate on which a dielectric layer and a protective layer are provided, with a carrier plate provided with a phosphor layer comprising a red and a blue phosphor as well as a green, $Tb^{3+}$-activated phosphor, with a ribbed structure which subdivides the space between the front plate and the carrier plate into plasma cells which are filled with a gas comprising xenon, and with one or several electrode arrays on the front plate and the carrier plate for generating corona discharges in the plasma cells, wherein the gas comprises xenon in a proportion of between 5 and 30% by volume.

It is particularly highly preferred that the proportion of xenon in the gas is 10% by volume.

An increased proportional quantity of xenon in the gas surprisingly increases the y-value of the color point of $Tb^{3+}$-activated phosphors. The result is that the green pixels of a plasma picture screen with a $Tb^{3+}$-activated phosphor show a sufficiently saturated green.

It is furthermore preferred that the green $Tb^{3+}$-activated phosphor is chosen from the group $(In_xGd_{1-x})BO_3$:Tb ($0 \leq x \leq 1$), $Y_2SiO_5$:Tb, $CeMgAl_{11}O_{19}$:Tb, $(Y_{1-x-y}Gd_xPr_y)BO_3$:Tb ($0 \leq x \leq 1$, $0 \leq y \leq 0.05$), $GdMgB_5O_{10}$:Ce,Tb and $LaPO_4$:Ce,Tb.

These $Tb^{3+}$-activated phosphors are particularly efficient green-emitting phosphors when excited by VUV light.

It may be particularly highly preferable for the green $Tb^{3+}$-activated phosphor to comprise $(Y_{1-x-y}Gd_xPr_y)BO_3$:Tb ($0 \leq x \leq 1$, $0 \leq y \leq 0.05$).

This phosphor has a short decay time $t_{1/10}$=8 ms and a high y-value>0.61 of its color point.

BRIEF DESCRIPTION OF THE DRAWING

The invention will be explained in more detail below with reference to a FIGURE and an embodiment, with FIG. 1 showing the construction and operating principle of a single plasma cell in an AC plasma picture screen.

DETAILED DESCRIPTION

Figure 1:
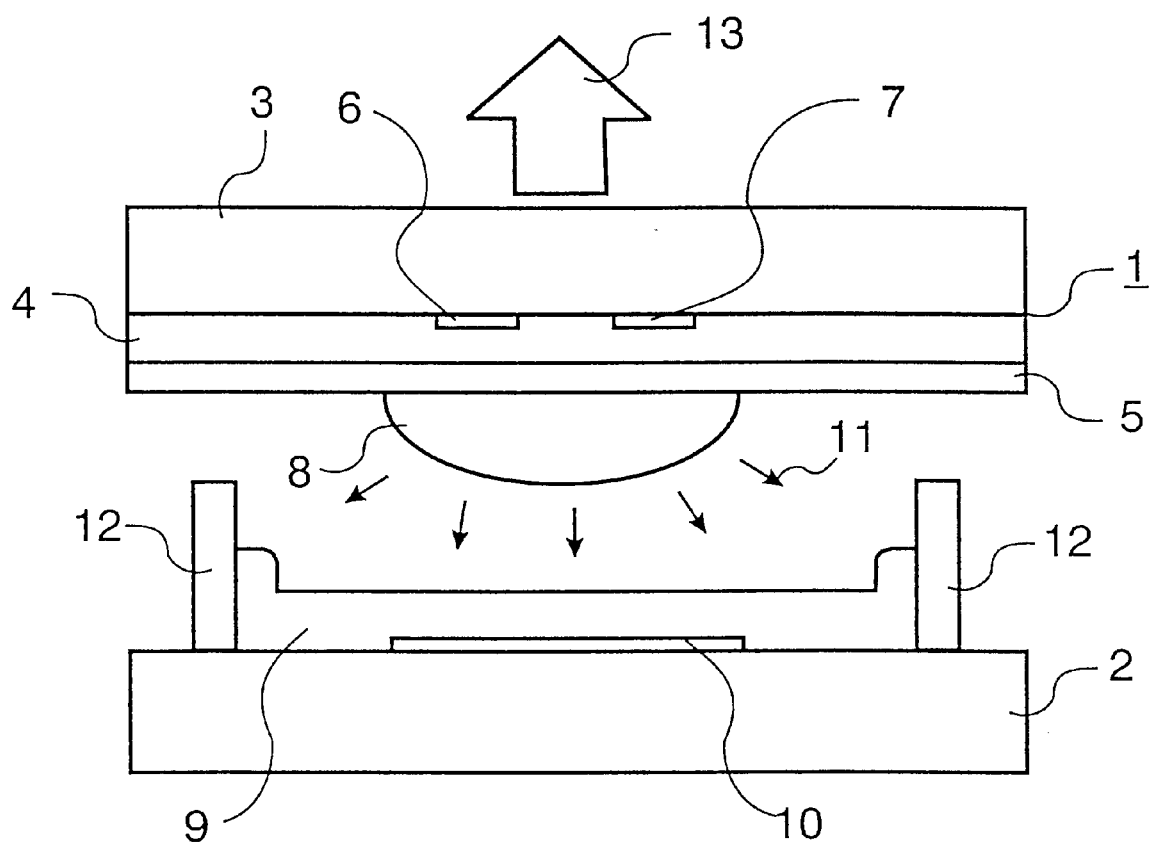

In FIG. 1, a plasma cell of an AC plasma picture screen with a coplanar arrangement of the electrodes comprises a front plate 1 and a carrier plate 2. The front plate 1 comprises a glass plate 3 on which a dielectric layer 4 and thereon a protective layer 5 are provided. The protective layer 5 is preferably made of MgO, and the dielectric layer 4, for example, of glass containing PbO. Parallel, strip-shaped discharge electrodes 6, 7 are provided on the glass plate 3 and are covered by the dielectric layer 4. The discharge electrodes 6, 7 are made, for example, of metal or ITO. The carrier plate 2 is made of glass, and parallel, strip-shaped address electrodes 10, for example made of Ag, are provided on the carrier plate 2 so as to run perpendicularly to the discharge electrodes 6, 7. Said address electrodes are covered with respective phosphor layers 9 which each emit light in one of the three basic colors red, green, or blue. The individual plasma cells are separated by a ribbed structure 12 with separating ribs which are preferably made of a dielectric material.

A gas, preferably a rare gas mixture of, for example, He, Ne, or Kr, which contains xenon in a quantity of 5 to 30% by volume is present in the plasma cell, and also between the discharge electrodes 6, 7, which alternate as the cathode and the anode. After ignition of the surface discharge, whereby charges can flow along a discharge path between the discharge electrodes 6, 7 in the discharge region 8, a plasma is formed in the discharge region 8 by which radiation 11 in the UV range, in particular in the VUV range, is generated, depending on the composition of the gas. This radiation 11 excites the phosphor layer 9 into phosphorescence, thus emitting visible light 13 in one of the three basic colors, which light issues through the front plate 1 to the exterior and thus forms a luminous pixel on the picture screen.

The dielectric layer 4 lying over the transparent discharge electrodes 6, 7 in an AC plasma picture screen serves to counteract a direct discharge between the discharge electrodes 6, 7 made of a conductive material, and thus the formation of an arc during ignition of the discharge.

A $Tb^{3+}$-activated phosphor such as, for example, $(In_xGd_{1-x})BO_3$:Tb ($0 \leq x \leq 1$), $Y_2SiO_5$:Tb, $CeMgAl_{11}O_{19}$:Tb, $(Y_{1-x-y}Gd_xPr_y)BO_3$:Tb ($0 \leq x \leq 1$, $0 \leq y \leq 0.05$), $GdMgB_5O_{10}$:Ce,Tb or $LaPO_4$:Ce,Tb is used as the green-emitting phosphor in the phosphor layer. Preferably, $(Y_{1-x-y}Gd_xPr_y)BO_3$:Tb ($0 \leq x \leq 1$, $0 \leq y \leq 0.05$) is used.

The gas preferably comprises a binary or ternary rare gas mixture of He/Xe, Ne/Xe, or He/Ne/Xe with a xenon quantity in the gas which lies between 5 and 30% by volume. Particularly preferred is a relative quantity of xenon in the gas of 10% by volume. The increase of the xenon quantity in the gas to more than 5% by volume increases the y-value of the $Tb^{3+}$-activated phosphors. As a result, the green pixels have a sufficiently green appearance.

A further advantage of the plasma picture screens with a xenon quantity above 5% by volume is that the intensity of the emission bands of neon in the 580 nm and 750 nm ranges is reduced as the xenon quantity increases. This also enhances the color saturation of the blue phosphors, i.e. the blue pixels.

The use of a $Tb^{3+}$-activated phosphor in combination with a gas comprising an increased proportion of xenon not only enhances the y-value of the color point of the green pixels, but also their luminance.

As Table 1 shows, the luminance of a monochrome plasma picture screen with $(Y,Gd)BO_3$:Tb as a phosphor increases by almost 30% compared with a monochrome plasma picture screen with $Zn_2SiO_4$:Mn. For a xenon content of 10% by volume in the gas, the color point of $(Y,Gd)BO_3$:Tb still lies within the range of ZnS:Cu ($x=0.31$, $y=0.61$), which is used as a green-emitting phosphor in color cathode ray tubes.

TABLE 1

CIE color points and luminance of monochrome plasma picture screens with $Zn_2SiO_4$:Tb or $(Y, Gd)BO_3$:Tb for various gas mixtures

| Gas composition [Vol.-%] | Phosphor | CIE color point [x, y] | Luminance [cd/m$^2$] |
|---|---|---|---|
| 3.5 Xe, 96.5 Ne | $Zn_2SiO_4$:Mn | 0.25, 0.67 | 1390 |
| 3.5 Xe, 96.5 Ne | (Y, Gd)BO$_3$:Tb | 0.36, 0.53 | 1820 |
| 10 Xe, 90 Ne | $Zn_2SiO_4$:Mn | 0.15, 0.74 | 2700 |
| 10 Xe, 90 Ne | (Y, Gd)BO$_3$:Tb | 0.31, 0.60 | 3700 |

An embodiment of the invention will now be explained in detail, representing an example of how the invention may be implemented in practice.

Embodiment

First a suspension of the phosphor $(Y,Gd)BO_3$:Tb was prepared, to which additives such as an organic binder and a dispersing agent were added. The suspension was provided in a structured manner on a carrier plate 2 by means of silk-screen printing and dried. This process step was carried out consecutively for the other two phosphor types with the emission colors red and blue. The carrier plate 2 was made of glass and had a ribbed structure 12 and address electrodes 10 of Ag. All organic additives remaining in the phosphor layers 9 were removed by a thermal treatment of the carrier plate 2 at 400 to 600° C. in an atmosphere containing oxygen.

The carrier plate 2 was used for assembling an AC plasma picture screen, together with a front plate 1 comprising a glass plate 3, a dielectric layer 4 of glass containing PbO, a protective layer 5 of MgO, and discharge electrodes 6, 7 of ITO, and a gas mixture having a composition of 10% Xe and 90% Ne by volume, which screen showed an improved color saturation and an improved color constancy.

What is claimed is:

1. A plasma picture screen provided with a front plate, which comprises a glass plate on which a dielectric layer and a protective layer are provided, with a carrier plate provided with a phosphor layer comprising a red and a blue phosphor as well as a green, $Tb^{3+}$-activated phosphor, with a ribbed structure which subdivides the space between the front plate and the carrier plate into plasma cells which are filled with a gas comprising xenon, and with one or several electrode arrays on the front plate and the carrier plate for generating corona discharges in the plasma cells, characterized in that the gas comprises xenon in a proportion of between 5% and 30% by volume.

2. A plasma picture screen as claimed in claim 1, characterized in that the proportion of xenon in the gas is 10% by volume.

3. A plasma picture screen as claimed in claim 1, characterized in that the green $Tb^{3+}$-activated phosphor is chosen from the group $(In_xGd_{1-x})BO_3$:Tb ($0 \leq x \leq 1$), $Y_2SiO_5$:Tb, $CeMgAl_{11}O_{19}$:Tb, $(Y_{1-x-y}Gd_xPr_y)BO_3$:Tb ($0 \leq x \leq 1$, $0 \leq y \leq 0.05$), $GdMgB_5O_{10}$:Ce,Tb and $LaPO_4$:Ce,Tb.

4. A plasma picture screen as claimed in claim 3, characterized in that the green $Tb^{3+}$-activated phosphor comprises $(Y_{1-x-y}Gd_xPr_y)BO_3$:Tb ($0 \leq x \leq 1, 0 \leq y \leq 0.05$).

* * * * *